Jan. 20, 1931.   G. H. GUNNELL   1,789,546
JOURNAL BEARING PROTECTOR
Filed June 7, 1929
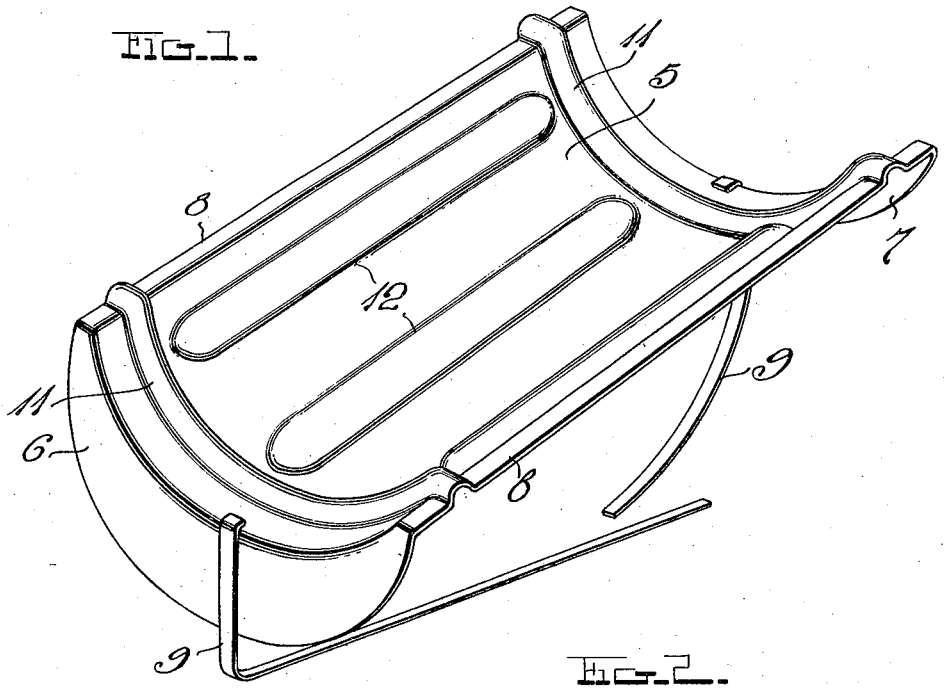
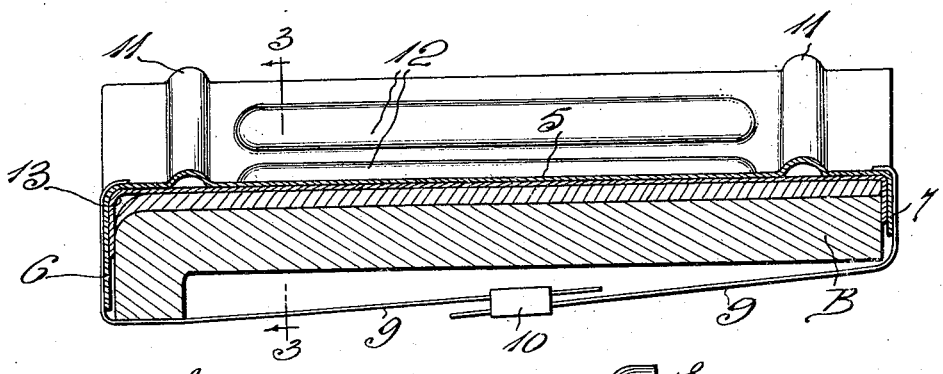
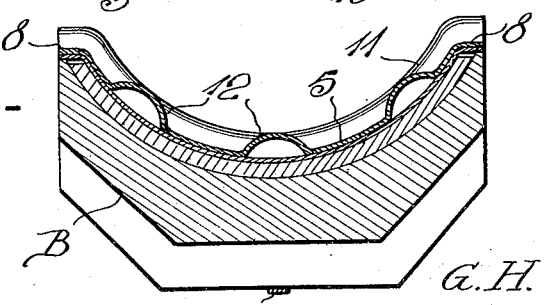
Inventor
G. H. Gunnell Patented Jan. 20, 1931

1,789,546

UNITED STATES PATENT OFFICE

GEORGE H. GUNNELL, OF CHICAGO, ILLINOIS

JOURNAL-BEARING PROTECTOR

Application filed June 7, 1929. Serial No. 369,180.

In the handling and shipping of journal bearings such as those commonly used on railway cars, the broached or other finished faces of the bearings very often become more or less seriously injured, either by contact of the bearings with each other or by striking of them against other parts. It is the object of my invention however to provide a new and improved protector whereby injury to the bearings prior to use, is prevented.

With the foregoing in view, the invention resides in the novel subject matter hereinafter described and claimed, description being accomplished by reference to the accompanying drawing.

Fig. 1 is a perspective view of a bearing protector constructed in accordance with my invention.

Fig. 2 is a longitudinal sectional view showing the protector applied to a bearing.

Fig. 3 is a transverse sectional view on line 3—3 of Fig. 2.

The drawing above briefly described illustrates one embodiment of the invention but it is to be understood that within the scope of said invention as claimed, numerous variations may be made.

The numeral 5 denotes an elongated metal sheet which is pressed into concavo-convex form in transverse section, but in longitudinal section is substantially straight, conforming to the shape of a journal box bearing B. At its opposite ends, the sheet 5 is provided with integral, laterally projecting flanges 6—7 to abut the ends of the bearing B, said flanges being preferably of different widths as shown. Along its longitudinal edges, the sheet 5 is provided with laterally projecting flanges 8 to lie upon the edges of the bearing B. The major portion of the sheet 5 protects the journal-engaging inner side of the bearing B, the flanges 6—7 protect the ends of said bearing and the flanges 8 protect the longitudinal edges of the bearing.

Any desired means may be provided for securing the protector upon the bearing. I have shown two pliable metal strips or ties 9 for this purpose, said ties being suitably secured to the ends of the protector. In practice, these ties are brought together at the exterior of the bearing as shown in Fig. 2 and may be secured to each other by twisting them together, by a seal 10, or in any other desired way.

Preferably, the protector is provided with a multiplicity of spaced projections on its concave side and adapted to become distorted if struck. Thus, these projections will absorb blows which might otherwise injure the protected bearing. In the present showing, the projections in question are in the form of concavo-convex ribs, two of which are denoted at 11, while the others are designated by the number 12. The ribs 11 are transversely disposed near the ends of the protector and extend from one longitudinal edge thereof to the other, while the ribs 12 are longitudinally disposed. In addition to performing the function already explained, these various ribs serve as effective reinforcing means for the light metal protector, both prior to application thereof to the bearing and while in use.

By the use of my invention, injury to journal bearings which is now quite a common occurrence during handling and shipment, is prevented and the cost of obtaining the protection for the bearings, is exceptionally small.

If desired, a flexible lining 13 of paper, cardboard or any other desired material, may be provided for the protector to be interposed between it and the bearing, as shown. This lining may be a separate element from the metallic protector or it may be cemented to the latter or otherwise attached thereto to provide a single unitary structure.

I claim:—

1. A journal box bearing protector comprising a sheet of material of concavo-convex form in transverse section and substantially straight in longitudinal section to conform to the shape of the journal-engaging side of a bearing, the ends of said sheet being provided with flanges projecting laterally from its convex side and adapted to abut the ends of the bearing.

2. A journal box bearing protector comprising a sheet of material of concavo-convex form in transverse section and substantially straight in longitudinal section to conform to the shape of the journal-engaging side of a bearing, the ends of said sheet being provided with flanges projecting laterally from its convex side and adapted to abut the ends of the bearing, the longitudinal edges of said sheet being provided with lateral flanges to lie against the longitudinal edges of the bearing.

3. A journal box bearing protector comprising a sheet of material of concavo-convex form in transverse section and substantially straight in longitudinal section to conform to the shape of the journal-engaging side of a bearing, said sheet having a plurality of impact-absorbing projections on its concave side, said projections being of concavo-convex form and being adapted to become distorted if struck, thereby absorbing shocks which might otherwise injure the bearing.

4. A structure as specified in claim 3; said projections being in the form of ribs, some of said ribs being transversely disposed near the ends of said sheet and the others being longitudinally positioned between said transverse ribs.

5. A structure as specified in claim 1; together with a plurality of pliable metal ties secured to said sheet for use in securing the latter in place upon a bearing.

6. A structure as specified in claim 1; said sheet being of metal, and a yieldable lining on the convex side of said sheet to abut the bearing.

In testimony whereof I have hereunto affixed my signature.

GEORGE H. GUNNELL.